UNITED STATES PATENT OFFICE.

WILLIAM MORRISON, OF DES MOINES, IOWA.

STORAGE-BATTERY ELECTRODE AND PROCESS OF MAKING IT.

1,008,852.

Specification of Letters Patent. Patented Nov. 14, 1911.

No Drawing. Application filed September 29, 1911. Serial No. 651,961.

*To all whom it may concern:*

Be it known that I, WILLIAM MORRISON, a citizen of the United States, residing at Des Moines, in the county of Polk and State of Iowa, have invented certain new and useful Improvements in Storage-Battery Electrodes and Processes of Making Them, of which the following is a specification.

In accordance with this invention I produce an electrode for storage or secondary batteries, in which the active material is impregnated with and bonded by nitrocellulose, specifically celluloid, in the form of a coherent skeleton, sponge or film holding enmeshed the particles of the active material.

The preferred process of making a positive-pole lead peroxid electrode is as follows: An antimonial lead grid or other suitable support and conductor is pasted with a mixture of red-lead, litharge, sulfuric acid and a small amount of an aqueous hydrogen peroxid solution and allowed to thoroughly dry. The surfaces of the active material are then scraped, as with a sharp-edged tool, to remove any glaze or skin and open the surficial pores. The electrode is then dipped in an aqueous solution of sulfuric acid containing some hydrogen peroxid, and is again allowed to dry, causing the paste to fully swell and come in close contact with the grid. The pasted grid is initially formed by subjecting it to anodic oxidation in an aqueous sulfuric acid solution, is discharged, and is removed from the solution and dried. This formation increases the conductivity of the particles of lead oxid and causes them to come into close electrical contact with each other and with the grid, giving the electrode the maximum conductivity prior to the introduction of the celluloid or other bond, which is a non-conductor. The active material is now impregnated with celluloid by submerging the electrode in a dilute solution of celluloid in acetone, the solution covering the electrode to a considerable depth, to cause it to enter the pores of the active material. It is allowed to remain in the solution until all air-bubbles cease to rise therefrom, that is until the pores have been filled with the solution. The vessel containing the solution is then quickly emptied and is refilled with pure acetone, which is allowed to act on the electrode for a minute or two, to remove any excess of celluloid adhering to the external surfaces of the active material and grid. The electrode is then removed from the acetone, and is dried. The electrode is finally subjected to prolonged formation until the lead sulfate in the paste is entirely or substantially all converted into lead peroxid, no lead sulfate binder being requisite in this electrode, as in the ordinary one. The pure acetone employed for washing the electrode is subsequently employed for the preparation of the celluloid solution.

The initial formation of the electrode may be omitted and the pasted grid, with the active material swelled and scraped, may be directly put into a weak celluloid solution. But this modified procedure causes a considerable loss of electric current in the subsequent formation of the electrode.

Electrodes thus treated have a greatly increased durability and may be charged at a greatly increased rate. Their durability and charge-rate capacity may be still further increased by repeating the treatment, that is by again submerging them in a celluloid solution and washing with acetone. A rectangular plate measuring six by eight inches which has been subjected to four treatments may be charged at a rate two or three times the normal one, for example with a current of 20 amperes. The celluloid bond interpenetrates the active material as an adsorbed skeleton, sponge or film, enmeshing the discrete particles of the paste but leaving open pores between them for the battery electrolyte, as distinguished from a binder which is mechanically mixed with the paste before it is applied to the grid and practically fills the spaces between the particles of active material. The thickness and strength of the adsorbed film of celluloid vary directly as the number of treatments with the celluloid solution.

According to a modification, a solution of gun cotton in ether, or one of rubber and sulfur in carbon disulfid, may be substituted for the celluloid solution. The rubber bond is cured or vulcanized, as by heating the electrode.

While the invention has been described in connection with the production of a pasted electrode, it will be understood that it is also applicable to electrodes of the Planté type, in which the active material is electrolytically formed from the metal of the electrode.

The term "desiccated solute" as used in the claims means the solid evaporation-product of the solution of a binder, that is the celluloid or rubber solute freed from the solvent.

I claim:

1. A storage battery electrode, comprising a body of formed active material interpenetrated with and bonded by an adsorbed skeleton, sponge or film of a desiccated solute.

2. A storage battery electrode, comprising a body of formed active material interpenetrated with and bonded by an adsorbed skeleton, sponge or film of a desiccated solute of nitrocellulose.

3. A storage battery electrode, comprising a body of formed active material interpenetrated with and bonded by an adsorbed skeleton, sponge or film of a desiccated solute of celluloid.

4. The process of making storage battery electrodes, which consists in enmeshing the particles of the active material in an adsorbed skeleton, sponge or film of a desiccated solute.

5. The process of making storage battery electrodes, which consists in enmeshing the particles of the active material in an adsorbed skeleton, sponge or film of a desiccated solute of nitrocellulose.

6. The process of making storage battery electrodes, which consists in enmeshing the particles of the active material in an adsorbed skeleton, sponge or film of a desiccated solute of celluloid.

7. The process of making lead peroxid electrodes, which consists in initially forming the electrode, filling the pores of the active material with a solution of a binder, and eliminating the solvent.

8. The process of making lead peroxid electrodes having a celluloid bond, which consists in initially forming the electrode, filling the pores of the active material with a solution containing dissolved celluloid, and eliminating the solvent.

9. The process of making lead peroxid electrodes having a nitrocellulose bond, which consists in initially forming the electrode, submerging it in a solution containing dissolved nitrocellulose, and washing the electrode with a solvent of nitrocellulose.

10. The process of making lead peroxid electrodes having a nitrocellulose bond, which consists in initially forming the electrode, submerging it in a solution containing dissolved nitrocellulose, washing the electrode with a solvent of nitrocellulose, and again forming the electrode, treating it with a solution of nitrocellulose and washing.

11. The process of making lead peroxid electrodes having a celluloid bond, which consists in initially forming the electrode, submerging it in a solution containing dissolved celluloid, and washing the electrode with a solvent of celluloid.

12. The process of making lead peroxid electrodes having a celluloid bond, which consists in initially forming the electrode, submerging it in a solution containing dissolved celluloid, washing the electrode with a solvent of celluloid, and again forming the electrode, treating it with a solution of celluloid and washing.

13. The process of making pasted lead peroxid electrodes having a celluloid bond, which consists in expanding the active material, scraping the surfaces of the active material, submerging the electrode in a solution containing dissolved celluloid, and washing it in a solvent of celluloid.

14. The process of making pasted lead peroxid electrodes having a celluloid bond, which consists in expanding the active material, scraping the surfaces of the active material, initially forming the electrode, submerging it in a solution containing dissolved celluloid, and washing it in a solvent of celluloid.

In testimony whereof I affix my signature in presence of two witnesses.

WILLIAM MORRISON.

Witnesses:
ROBERT I. HULSIZER,
CHARLES H. POTTER.